UNITED STATES PATENT OFFICE.

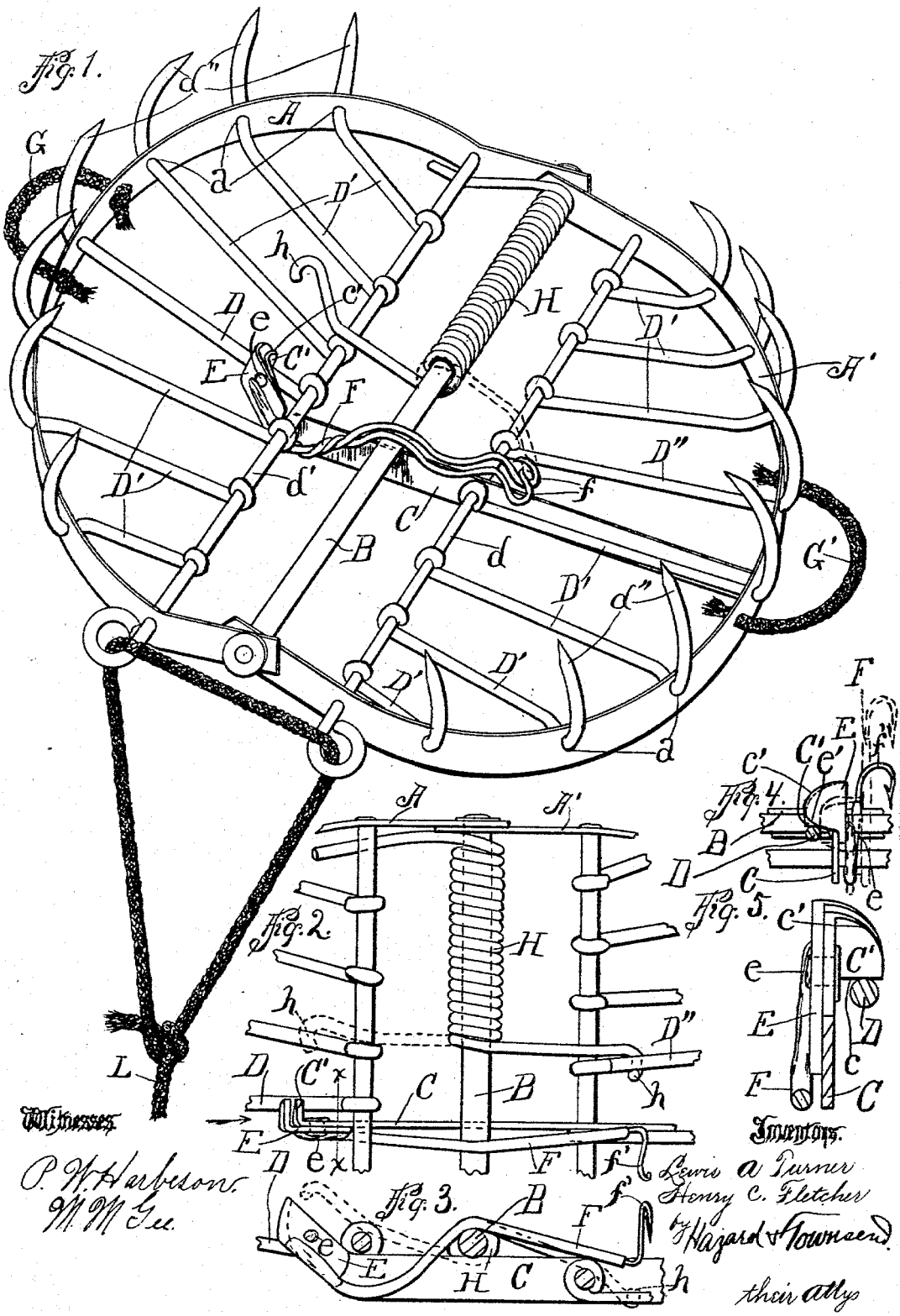

LEWIS A. TURNER AND HENRY C. FLETCHER, OF LOS ANGELES, CALIFORNIA, ASSIGNORS TO HILTON W. ARMSTRONG AND BRACE GIBSON, OF SAME PLACE.

TRAP.

SPECIFICATION forming part of Letters Patent No. 515,980, dated March 6, 1894.

Application filed October 18, 1892. Serial No. 449,250. (Model.)

*To all whom it may concern:*

Be it known that we, LEWIS A. TURNER and HENRY C. FLETCHER, citizens of the United States, residing at Los Angeles, in the county of Los Angeles and State of California, have invented certain new and useful Improvements in Traps, of which the following is a specification.

Our invention relates more especially to those traps known as jaw traps and relates particularly to the trigger and the mechanism for setting the trap easily.

Our invention also relates to certain improvements whereby the jaw may be conveniently relieved from the operation of the jaw-actuating spring when the trap is not set and when it is desired to bait the trap or to remove it from the fish or from the animal caught, thus to avoid all danger to the operator from accidental springing of the trap.

Our invention also relates to other features and combinations of parts hereinafter fully set forth.

Our invention consists in a trap comprising the combination of two jaws pivoted to each other; a spring connected with such jaws and adapted to force them together; a spring trigger-arm fixed to one jaw at one end and arranged with its other end projecting beyond the pivotal axis of the jaws and provided with a retaining lug having a rounded seating face and a retaining face adapted to engage the other jaw; a trigger-retaining seat fixed to the other jaw in the path of the retaining lug; a trigger-detaching arm pivoted to the trigger-arm and provided with a cam-trigger-detaching lug arranged to engage the jaw of the trap to force the trigger-retaining lug out of engagement with such other jaw, and an operating lever fixed to the trigger-detaching lug and adapted to receive and retain the bait. It also comprises the combination of the two jaws of the trap pivoted together by a pivot-bolt, each of such jaws being provided with cross bars arranged near such pivot-bolt, and with a series of claw wires having their inner ends secured to the cross bar and their outer ends secured to the jaw; such pivot-bolt extending across the trap and arranged to pivot the jaws together; and a jaw-operating spring consisting of a spiral arranged to encircle the pivot-bolt and having projecting ends, one of which is arranged in engagement with one of the jaws, and the other of which is arranged between the cross bars and forms a long lever provided with a hook at its end adapted to be detachably hooked upon one of the claw wires of the other jaw, and to be conveniently unhooked therefrom so that when so hooked the spring will operate to force the jaws together and when unhooked the jaws will be released and allowed to open freely and the long lever will rest against the cross bar of the jaw which is engaged by the other end of the spring and will thus be retained in convenient position to be again attached to its jaw. This also prevents the spring from uncoiling when such lever is detached from its jaw.

The accompanying drawings illustrate our invention.

Figure 1 is a perspective view of a trap provided with our improvements, and showing the spring released from the jaws to allow the trap to be baited in safety. Dotted lines indicate the position of the spring when the trap is set. Fig. 2 is a fragmental plan view showing the arrangement of the spring and trigger when the trap is set. Fig. 3 is a view of the same parts, looking from the lower edge of Fig. 2. Fig. 4 is a fragmental view showing the trigger, and looking to the right from the left of Fig. 2. Dotted lines indicate the position of the parts at the moment the trap is sprung. Fig. 5 is a fragmental sectional view showing the trigger resting in its set position. Line $x-x$ Fig. 2 indicates the line of section, looking toward the left.

A, A' represent respectively the two jaws of a trap which are pivoted to each other by the spring-carrying and jaw-pivoting bolt B.

C is the trigger-arm which is fixed to one of the jaws (A') and extends across the pivotal axis of the jaws and at its end is provided with a catch or retaining lug C' arranged to engage the other jaw (A,) through the medium of the claw wire D.

Our invention as illustrated is applied to a trap suitable for catching fish, and, in addition to the jaws A A', is provided with a series of claw wires, D, D', &c., the inner ends of which are secured to suitable cross bars d d', and the outer ends of which are passed through suitable perforations a in the jaws A A' and are bent upward and inward, and have their ends sharpened to form the claws d'' which are adapted to catch and hold any object which may be between the jaws when they are forced together.

The trigger-releasing device or lever consists of a plate E pivoted to the trigger-arm by a pivot e and having its outer end bent to project out even with the tip of the catch or lug C' upon the trigger-arm, and having a cam shaped engaging face e' arranged normally above the straight engaging face c of the lug C' to engage the jaw to spring the spring trigger-arm sidewise to release the lug from the jaw. To this plate E is rigidly fixed the lever or bait arm F which is shown in Fig. 1 is formed of two spring metal members fastened to each other at one end and having their free ends f adapted to be spread apart to permit the bait to be placed therebetween so that it will be retained thereby when the spring arms are released.

In Figs. 2, 3 and 4 we have shown the bait arm formed of one wire having a fish hook f' secured to its outer end and upon which the bait is placed.

G G' are loops of cord or other flexible contrivance which are provided upon the outer edge of each jaw and are adapted to receive the thumbs of the operator so that the jaws can be easily spread apart thereby without danger that the hand may be caught between the jaws. The flexible loops are each adapted to swing backward upon its respective jaw when the jaws are forced together and are not liable to catch upon any object to pry the jaws apart. This is especially important in landing fish, for if the loops were rigid, they might engage with the wharf or side of the vessel, and might cause the jaws to spring open and thus liberate the fish from the trap. This also allows the trap to lay flat on the ground which it cannot do when stiff projecting loops are rigidly secured to the trap as has heretofore been the case.

In baiting traps of this class heretofore great difficulty has been experienced in placing the bait upon the bait arm, because the spring has been attached to the jaws in such a manner that it could not be easily attached to and released therefrom. Thus, heretofore it has been customary to either bait the trap while the jaws were closed, or to open them and hold them open (either by the trigger or otherwise) against the action of the spring while baiting it. We overcome this objection by providing improved means for detachably connecting the spring to one of the jaws. This we do by providing one end of the spring H with a long lever provided with a hook h arranged to hook upon one of the claw wires (D''). When it is desired to bait the trap, the spring is unhooked from the claw wire, while the jaws are closed, and the spring released; then the jaws are spread open and the spring forces the long lever back until it rests against the cross bar d' which stops the lever and retains it in the position shown in solid lines in Fig. 1, and in dotted lines in Fig. 2; the bait is then placed in position. Then the jaws are again closed and the hook h is thus brought into convenient position to be again hooked upon its claw wire, (D'') and thus engaged again with its jaw to force the jaws together. The trap may then be set ready for use.

In fishing, the trap is used as follows;—The trap is first set. In doing this the thumbs of the operator are placed in the loops G G' and the jaws are forced into their open position shown in Fig. 1. The beveled top c' of the lug C' engages the bar or claw wire D, and thus forces the arm to spring outward or sidewise until the lug passes the bar or wire D when the elasticity of the arm forces it into the position shown in Figs. 2, 4 and 5, the jaws are then released by the operator and the straight retaining face c of the lug upon the arm engages the bar D and retains the jaw in its set position. The trap is then lowered into the water by means of a cord or line L. If a fish attempts to remove the bait from the bait arm F such arm is thereby pulled outward, thus forcing the cam face e' down upon the bar or claw wire D, against which it acts and thus forces the trigger-arm sidewise away from such wire until the lug C' is released from its engagement with the wire. The spring H then forces the jaws to close upon the nose of the fish which has attacked the bait. To release the fish, the spring H is released from the claw wire (D) and the jaws are thus allowed to open.

Now, having described our invention, what we claim as new, and desire to secure by Letters Patent, is—

1. A trap comprising the combination of two jaws pivoted to each other; a spring connected with such jaws and adapted to force them together; a spring trigger-arm fixed to one jaw at one end and arranged with its other end projecting beyond the pivotal axis of the jaws and provided with a retaining lug having a rounded seating face and a retaining face adapted to engage the other jaw; a trigger-retaining seat fixed to the other jaw in the path of the retaining lug; a trigger-detaching arm pivoted to the trigger arm and provided with a cam trigger-detaching lug arranged to engage the jaw of the trap to force the trigger-retaining lug out of engagement with such other jaw, and an operating lever fixed to the trigger-detaching lug and adapted to receive and retain the bait.

2. The combination of the two jaws of the trap pivoted together by a pivot-bolt each of such jaws being provided with cross bars arranged near such pivot-bolt and with a series of claw wires having their inner ends secured to the cross bar and their outer ends secured to the jaw; such pivot-bolt extending across the trap and arranged to pivot the jaws together; and a jaw-operating spring consisting of a spiral arranged to encircle the pivot-bolt and having projecting ends, one of which is arranged in engagement with one of the jaws and the other of which is arranged between the cross bars and forms a long lever provided with a hook at its end adapted to be detachably hooked upon one of the claw wires of the other jaw and to be conveniently unhooked therefrom.

3. A trap comprising the combination of the two jaws pivoted to each other; a spring arranged to force such jaws together; a trigger arm rigidly fixed at one end to one of the jaws and having its other end projecting beyond the pivotal axis of the jaws and provided with a lug or catch arranged and adapted to engage the other jaw when the jaws are open to hold the jaws extended; a trigger-releasing device pivoted to such trigger-arm and provided with a suitable bait-holder and with a cam face adapted to engage the jaw of the trap to thereby operate to disengage the lug or catch of the trigger-arm from its engagement with the jaw.

4. A trap comprising the combination of two jaws pivoted to each other; a spring adapted and arranged to force such jaws together; the trigger-arm rigidly fixed at one end to one of the jaws and having its other end arranged to project beyond the pivotal axis of the jaws and provided with a lug projecting from one side of such arm and arranged to engage the other jaw when the jaws are open, (to retain the trap in its set position); and a suitable device arranged on such trigger-arm and provided with an actuating arm and adapted to engage the jaw and by its action thereagainst to spring the trigger-arm sidewise to release the lug from its engagement with the jaw.

5. A trap provided with a trigger comprising a trigger arm provided with a lug projecting from one side of such arm and arranged to engage a support to hold the trap open; a trigger-releasing cam pivoted to such trigger-arm and arranged to engage the support with its cam face to spring the trigger-arm sidewise to release the lug from the support, and the bait arm fixed to the cam.

6. A trap provided with a bait-holding device comprising two oppositely arranged spring arms secured together at one end and each provided at its free end with a suitable bait holding hook, all so arranged that when the arms are sprung apart and the bait is placed between the free ends, the spring arms will force such ends together to clasp the bait.

LEWIS A. TURNER.
HENRY C. FLETCHER.

Witnesses:
JAMES R. TOWNSEND,
ALFRED I. TOWNSEND.

It is hereby certified that the name of the first-mentioned assignee in Letters Patent No. 515,980, granted March 6, 1894, upon the application of Lewis A. Turner and Henry C. Fletcher, of Los Angeles, California, for an improvement in "Traps," was erroneously written and printed "Hilton W. Armstrong," whereas said name should have been written and printed *Milton W. Armstrong;* and that the said Letters Patent should be read with this correction therein that the same may conform to the corrected files and records of the case in the Patent Office.

Signed, countersigned, and sealed this 3d day of April, A. D. 1894.

[SEAL.]
                                        JNO. M. REYNOLDS,
                                        *Assistant Secretary of the Interior.*

Countersigned:
    JOHN S. SEYMOUR,
        *Commissioner of Patents.*